July 11, 1967 W. T. DENNISON 3,330,475
VANE CONSTRUCTION IN TURBOFAN ENGINE
Filed April 12, 1965 2 Sheets-Sheet 1

INVENTOR
WILLIAM T. DENNISON
BY Charles A Warren
ATTORNEY

INVENTOR
WILLIAM T. DENNISON
BY Charles Q Warren
ATTORNEY

United States Patent Office 3,330,475
Patented July 11, 1967

3,330,475
VANE CONSTRUCTION IN TURBOFAN ENGINE
William T. Dennison, West Hartford, Conn., assignor to United Aircraft Corporation, East Hartford, Conn., a corporation of Delaware
Filed Apr. 12, 1965, Ser. No. 447,285
11 Claims. (Cl. 230—122)

This invention relates to a vane construction for a turbofan engine and more particularly to the vane arrangement and attachment downstream of the fan.

In this type of engine the fan air is divided between the engine air duct and the fan air duct, the latter surrounding the engine. The air entering the fan duct has a swirl which is preferably minimized by guide vanes extending across the duct, and the engine air is acted upon by stator vanes which direct the air against compressor blades. A feature of the invention is an arrangement for mounting these vanes and for supporting these vanes from the outer duct wall. Another feature is the provision for supporting the intermediate wall from these vanes.

Since the stator vanes for the compressor are supported by this intermediate wall, the latter must be securely located within the powerplant. One feature of the invention is an arrangement for supporting the vanes from the outer case, both the guide vanes for the outer duct and the vanes in the inner duct.

Another feature is a light-weight, high-strength, structural support system which serves as an engine mount ring and also a stator support ring.

Other features and advantages will be apparent from the specification and claims, and from the accompanying drawings which illustrate an embodiment of the invention.

Figure 1:
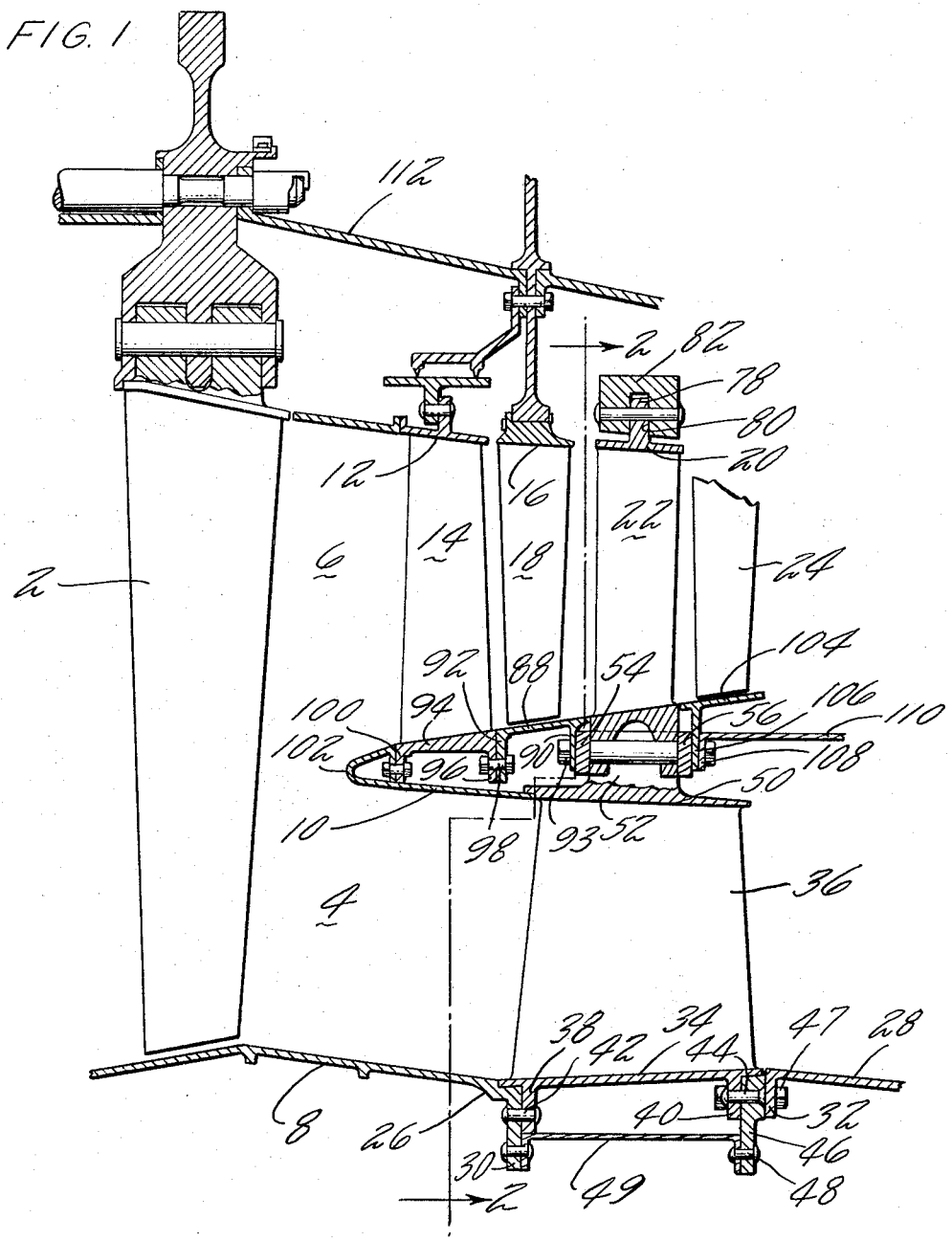
FIG. 1 is a fragmentary longitudinal sectional view through a turbofan engine showing the invention.

The invention is shown in a fan engine of the general type disclosed in Hopper Patent No. 2,979,900. Air entering the engine is compressed by the fan represented by the last row of moving blades 2. From the fan 2 the air is divided into an outer duct 4 constituting the fan duct or an inner duct 6 constituting the engine air duct. The duct 4 has an outer wall 8 which is the main wall of the engine and the intermediate wall 10 which defines the inner wall of the outer duct 4. This intermediate wall 10 forms the outer wall of the inner duct 6 and the inner wall of this duct is made up of shrouds 12 on a row of stator vanes 14 and shrouds 16 on a row of blades 18 and shrouds 20 on the inner end of a row of stator vanes 22. The alternating rows of vanes 14 and blades 18 and 24 constitute the first stages of the compressor for the engine air.

The outer duct wall 8 is made up of spaced rings 26 and 28 having opposed flanges 30 and 32 between which are positioned the shrouds 34 on the outer ends of the vanes 36 which extend inwardly across the outer duct 4. These are guide vanes and serve to straighten the flow of air entering the duct from the row of fan blades 2. As shown, each shroud 34 has a front peripheral flange 38 and a rear peripheral flange 40 attached to the outer wall 8 to form a part thereof.

Figure 2:
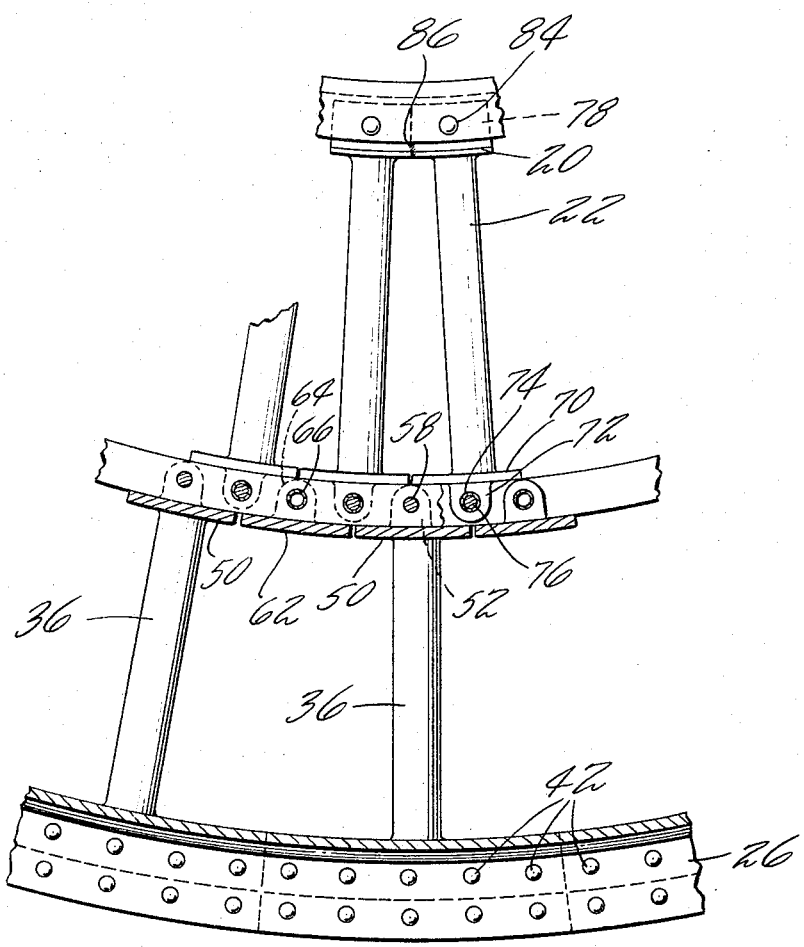
FIG. 2 is a sectional view substantially along the line 2—2 of FIG. 1.

As shown, the front flange 38 is held by rivets 42 to the flange 26 and the rear flange 40 is held by rivets 44 to a ring 46 and by alternating bolts 47 to the flange 32. The ring 46 is riveted as at 48 to a sleeve 49 surrounding the shrouds 34 and the front end of this sleeve is riveted to flange 26. As best shown in FIG. 2, each flange 38 and 40 has a plurality of rivets therein forming a secure and inflexible attachment of the shroud 34 into the wall 8 to form an effective part thereof.

The inner end of each vane 36 has a shroud 50 thereon and a lug 52 extending inwardly from the shroud 50 fits between spaced rings 54 and 56. A rivet or pin 58 extends in an axial direction through the lug 52 and through the rings 54 and 56 to provide a pivotal attachment for each vane at this point. Located between adjacent vanes 36 is a spacer element 62 which is located between the shroud elements 50 of adjacent vanes and serves to close the space therebetween. Each spacer element 62 has a projecting lug 64 located between the rings 54 and 56 and are held in position by a rivet or pin 66. The lugs 64 are spaced uniformly between the lugs 52 on adjacent vanes 36, as will be apparent.

The row of stator vanes 22 extending inwardly from the rings across the inner duct 6 are secured to the spacer rings 54 and 56 in much the same way as the vanes 36. Each of these vanes has a shroud 70 on its outer end with a lug 72 projecting outwardly therefrom and positioned between the spaced rings 54 and 56. A hollow pin 74 holds the lugs 72 in position and a bolt 76 extends through the pin 74 and through the rings 54 and 56. In the arrangement shown, the vanes 22 are double in number to the vanes 36 so that the bolts 76 are uniformly spaced between rivets 58 and 66, respectively, and the shroud elements 70 form a substantially continuous surface along the radially inward surface of the spaced rings.

The inner ends of the vanes 22 carry the shroud elements 20 and each of these shroud elements has a radially extending lug 78 fitting with a groove 80 in a support ring 82. Suitable rivets 84 engage with the lugs 78 and extend through the ring 82 to hold the inner ends of the vanes 22 securely. In addition, each pair of vanes 22 is secured together at its inner end as by a weld attachment 86 between the ends of the respective lugs 78 and between the ends of the respective shrouds 20. Thus the pair of vanes 22, shown in FIG. 2, are securely attached together so that these two vanes act as a unit and therefore cannot move with respect to each other. In this way the outer end lugs 72 on these same vanes are held rigidly in fixed relation to each other and provide a firm support to prevent relative motion between the respective parts of the device as shown and described.

The intermediate wall 10, as above stated, is supported securely in position between the outer and inner ducts 4 and 6 by rings 54 and 56. Thus, as shown, a shroud element 88 for the outer ends of the blades 18 has circumferential flanges 90 and 92 thereon. This shroud ring 88 is continuous and is secured in position by the bolts 76, as shown in FIG. 1, where the flange 90 is located beneath the nuts 93 on these bolts. The flange 92 supports the outer shroud elements 94 of the row of stator vanes 14 since these shroud elements carry longitudinal flanges 96 that are bolted as by bolts 98 to the flange 92. Each shroud element 94 carries a front flange 100 that supports leading edge ring 102 for the intermediate wall.

Downstream of the vane 22 is a shroud ring 104 for the blades 24 and this shroud ring has a flange 106 positioned under the heads 108 of the bolts 76 so that this shroud ring is also held in position. The bolts 76 also support an engine casing 110 in the form of a sleeve extending downstream from the ring 56. This casing may support a rotor bearing for the rotor 112 which includes the row of fan blades 2 and compressor blades 18.

It is to be understood that the invention is not limited to the specific embodiment herein illustrated and described, but may be used in other ways without departure from its spirit as defined by the following claims.

I claim:
1. In a turbofan engine, outer and intermediate walls defining between them an outer duct for air and the intermediate wall defining within it an inner duct, a row of guide vanes supported by the outer wall and extending across the outer duct and forming a support for the intermediate wall, a row of stator vanes extending across the inner duct, a ring to which the outer ends of the stator vanes are secured, the inner ends of the guide vanes being also secured to said ring, and means supporting the intermediate wall from the ring.

2. A turbofan engine as in claim 1 in which the inner ends of the stator vanes having shrouds thereon, and a ring interconnecting said shrouds.

3. A turbofan engine as in claim 2 in which adjacent pairs of stator vanes are attached together at their inner ends by a weld attachment between the shrouds.

4. A turbofan engine as in claim 1 in which the connection of the guide vanes and the stator vanes to the ring is by a pin for each vane.

5. A turbofan engine as in claim 4 in which the outer end of each of the guide vanes has an arcuate shroud thereon, and the shrouds are rigidly secured to the outer wall.

6. A turbofan engine including a fan, concentric inner and outer ducts downstream of the fan and receiving air therefrom, an outer wall for the outer duct, an intermediate wall between the ducts, and means for supporting the intermediate wall including a row of guide vanes having shrouds on the outer ends thereof forming a part of the outer wall, a peripheral row of attachment means providing a secure support of the shrouds within the outer wall, a pair of spaced rings within the intermediate wall, shrouds on the inner ends of the guide vanes having attachment means thereon, an axially extending pin through said attachment means on the inner end of each guide vane and through said rings for pivotal attachment of the guide vane, and spacer elements located between adjacent shrouds on the inner ends of the guide vanes, said spacer elements having lugs thereon, and other axially extending pins extending through said lugs and said rings to hold said spacer elements in position.

7. A turbofan engine as in claim 6 in which a plurality of stator vanes extend inwardly from the pair of rings across the inner duct, each stator vane having a lug thereon at its outer end and a row of axially extending pins alternating with the pins for the guide vanes and spacer elements and extending through the stator vane lugs and the spaced rings.

8. A turbofan engine as in claim 7 in which the stator vanes are arranged in pairs with the inner ends of the vanes of each pair attached together at their inner ends.

9. A turbofan engine as in claim 7 in which the stator vanes have inner end shrouds, an inner ring to which all the inner end shrouds are secured.

10. A turbofan engine as in claim 9 in which the stator vanes are arranged in pairs and the inner end shrouds of the vanes of each pair are permanently attached together.

11. A turbofan engine as in claim 7 in which means are provided for attaching the intermediate wall to said spaced rings.

References Cited

UNITED STATES PATENTS

| | | | |
|---|---|---|---|
| 2,526,281 | 10/1950 | Ryan et al. | 230—122 |
| 2,961,150 | 11/1960 | Pirtle | 230—133 |
| 2,971,745 | 2/1961 | Warren et al. | 230—122 |
| 3,070,285 | 12/1962 | Oldfield | 230—122 |
| 3,112,865 | 12/1963 | Gisslen | 230—122 |
| 3,132,842 | 5/1964 | Tharp | 230—122 |
| 3,182,898 | 5/1965 | Hewson | 230—122 |
| 3,264,482 | 8/1966 | Clark et al. | 230—122 |

FOREIGN PATENTS 989,556  5/1951  France.

DONLEY J. STOCKING, *Primary Examiner.*

H. F. RADUAZO, *Assistant Examiner.*